(12) United States Patent
Matsumura et al.

(10) Patent No.: US 6,416,559 B1
(45) Date of Patent: Jul. 9, 2002

(54) METHOD FOR MANUFACTURING ELECTRODES FOR BATTERY

(75) Inventors: Jun Matsumura, Otsu; Mitsugu Takaki, Toyohashi; Noriyuki Fujioka, Kosai; Munehisa Ikoma, Toyohashi, all of (JP)

(73) Assignees: Matsushita Electric Industrial Co., Ltd., Osaka; Toyota Jidosha Kabushiki Kaisha, Aichi-Ken, both of (JP)

( * ) Notice: Subject to any disclaimer, the term of this patent is extended or adjusted under 35 U.S.C. 154(b) by 0 days.

(21) Appl. No.: 09/566,124

(22) Filed: May 5, 2000

(30) Foreign Application Priority Data

May 14, 1999 (JP) ............................................. 11-134897

(51) Int. Cl.[7] ............................. H01M 4/70; H01M 4/80
(52) U.S. Cl. ............................. 29/623.1; 29/2; 429/233; 429/235
(58) Field of Search ................................ 429/233, 235; 29/2, 623.1, 623.5

(56) References Cited

U.S. PATENT DOCUMENTS

| 5,518,840 A | * | 5/1996 | Verhoog et al. | ............ | 429/211 |
| 6,025,095 A | * | 2/2000 | Kawamura | .................. | 429/235 |
| 6,214,491 B1 | * | 4/2001 | Imhof et al. | ................. | 429/211 |

FOREIGN PATENT DOCUMENTS

| EP | 0798795 A2 | 10/1997 |
| EP | 0840387 A1 | 5/1998 |
| JP | 02197054 | 8/1990 |
| JP | 5-190200 | 7/1993 |
| JP | 8-45500 | 2/1996 |

OTHER PUBLICATIONS

European Search Report dated Aug. 31, 2000.

* cited by examiner

*Primary Examiner*—Carol Chaney
(74) *Attorney, Agent, or Firm*—McDermott, Will & Emery

(57) ABSTRACT

The present invention discloses a method for manufacturing an electrode for a battery by filling an active material into a three-dimensional porous metal substrate sheet and cutting said sheet to a certain size, comprising the steps of: pressing the portion to be cut and the periphery thereof in the substrate sheet; coating the portion to be cut and the periphery thereof in the substrate sheet with a resin; and/or impregnating the portion to be cut and the periphery thereof in the substrate sheet with a liquid containing a resin component, in addition to the steps of: filling an active material into the substrate sheet; and cutting the substrate sheet at the portion to be cut. This method prevents the occurrence of burrs and cuttings while the sheet is being cut and the coming off of the active material, thereby suppressing internal short circuit of the battery. As a result, a battery hardly suffering from a deterioration in preservation performance and charge-discharge cycle life can be obtained.

5 Claims, 3 Drawing Sheets

F I G. 4
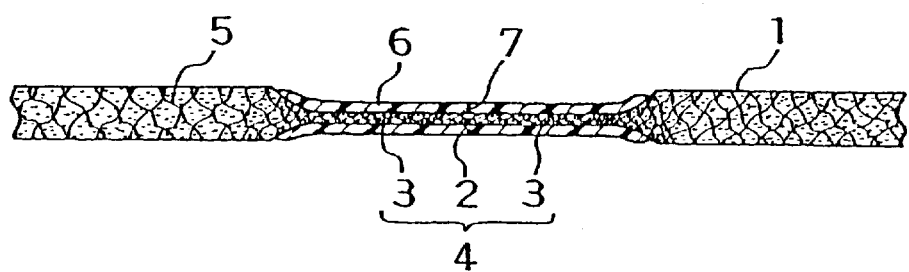

METHOD FOR MANUFACTURING ELECTRODES FOR BATTERY

BACKGROUND OF THE INVENTION

The present invention relates to a method for manufacturing electrodes for a battery, comprising a process of filling an active material into a three-dimensional porous metal substrate sheet and a process of cutting the sheet to a certain size.

In recent years, the variety of uses for batteries has rapidly increased since they began to be used as the power sources for portable appliances such as cellular phones and personal computers as well as for electric vehicles including electric cars. With this diversification, various types of batteries are being developed and improved from the viewpoint of enhancing battery performance such as energy density and reducing the cost.

As an important technique to obtain a battery with high-energy density, it has been studied to increase the electric capacity per volume of an electrode by filling an active material into the electrode substrate at a high density. For example, as the substrates of the positive electrodes in alkaline storage batteries including nickel-cadmium storage batteries, nickel-metal hydride storage batteries, and nickel-zinc storage batteries, a sintered-type porous metal sheet and three-dimensional porous metal substrate sheets such as a foamed metal sheet (sponge metal sheet), and a porous sheet of metallic fiber are used. By using these substrates, positive electrodes having a high capacity density are being developed The sintered-type porous metal sheet is obtained by applying a slurry containing nickel powder or some similar material onto a core sheet like a punched metal, and sintering it. By immersing the sintered sheet as the positive electrode in a nickel nitrate solution, and electrolyzing it, nickel hydroxide, which is an active material, can be precipitated inside the pores of the sintered sheet. This method is called an electrodeposition process. In order to fill the active material into the sintered sheet at higher density, a chemical impregnation process is employed for filling more nickel hydroxide into the sintered sheet. In the chemical impregnation process, an impregnation with a nickel nitrate solution and an immersion with an alkaline solution are conducted. A positive electrode obtained through these treatments excels in large current charge-discharge characteristics. However, the frame consisting of a sintered sheet including core sheet makes up about 25% of the entire volume of the sintered sheet, thereby setting limits to high-density filling of an active material.

On the other hand, a nickel positive electrode with a three-dimensional porous metal substrate sheet can have an active material therein at an extremely high density because of the high porosity of the substrate sheet. For example, a foamed nickel sheet has a porosity as high as 96%. This foamed nickel sheet can be obtained as follows. First, a conductive composite is applied on a foamed resin (sponge resin) sheet like polyurethane sheet, and then nickel is plated on the resin sheet. After this, the internal resin is removed by burning the sheet in a reducing atmosphere so as to provide a foamed nickel sheet.

The pores of the three-dimensional porous metal substrate sheet have a diameter of about 200 $\mu$m or above, which is about 10 times as large as the pores of a sintered-type porous metal substrate sheet. Such large pores can be directly filled with a paste, which is a mixture of an active material like nickel hydroxide powder, an additive like metallic cobalt, and water, by rubbing or pressing the paste thereinto.

Thus, employing a three-dimensional porous metal substrate sheet achieves an electrode having a high capacity, and greatly simplifies a process of filling an active material thereinto. The substrate sheet is also used for hydrogen storage alloy negative electrodes in nickel-metal hydride storage batteries.

On the other hand, the substrate sheet has a drawback that the active material filled thereinto tends to come off and adhere to the surface of the sheet.

Moreover, the frame of the three-dimensional porous metal substrate sheet is composed of acicular or fibriform metal complicatedly entangled, so that cutting the substrate sheet filled with the active material is likely to leave a number of sharp-pointed burrs.

When a battery is assembled with such an electrode, burrs and adherents penetrate the separator, causing the battery to short-circuit. This problem is the main cause of a decrease in the production yield of the electrode, and, deterioration in the preservation performance and charge-discharge cycle life of the battery.

A method for solving this problem has been suggested in Japanese Laid-Open Patent Publication No. 8-45500. In the Publication, after cutting the substrate sheet filled with an active material to a certain size or after cutting the substrate sheet to a certain size and filling an active material thereinto, the periphery of the substrate is pressed or removed. The pressing of the periphery of the substrate after cutting is done for the purposes of holding down the burrs occurred during the cutting and of making the periphery of the electrode thinner. The removing of the periphery of the substrate after cutting is done for the purpose of deburring. These processes, however, cannot prevent burrs once held down from rising again, or cuttings and fallen active material from adhering to the surface of the electrode. Thus, the battery still has the risk of an internal short circuit.

On the other hand, a method for covering the periphery and cross section of an electrode with a hot melt resin has been suggested (Japanese Laid-Open Patent Publication No. 5-190200). In this method, however, the electrode sheet is cut and then its cross section is covered with the resin, which is not related to suppressing the occurrence of sharp-pointed burrs or cuttings. These burrs and cuttings penetrate the resin layer, making it hard to prevent an internal short circuit in the battery.

The object of the present invention is, in a manufacturing process of an electrode for a battery employing a three-dimensional porous metal substrate sheet, to suppress the occurrence of burrs and cuttings and the coming off of an active material while the substrate sheet is being processed. Another object of the present invention is to improve the production yield of the electrode. Still another object of the present invention is to resolve an internal short circuit in the battery, thereby preventing deterioration in the preservation performance and charge-discharge cycle life of the battery.

BRIEF SUMMARY OF THE INVENTION

The present invention relates to a method for manufacturing an electrode for a battery by filling an active material into a three-dimensional porous metal substrate sheet and cutting the sheet to a certain size, comprising the steps of: (a) filling an active material into the substrate sheet, ($b_1$) pressing a portion to be cut and the periphery thereof in the substrate sheet, and (c) cutting the substrate sheet at the portion to be cut wherein the step ($b_1$) is conducted prior to the step (c).

This method preferably further comprises, prior to the step (c), either step of: ($b_2$) coating the portion to be cut and the periphery thereof in the substrate sheet with a resin, or ($b_3$) impregnating the portion to be cut and the periphery thereof in the substrate sheet with a liquid containing a resin component.

The present invention also relates to a method for manufacturing an electrode for a battery by filling an active material into a three-dimensional porous metal substrate sheet and cutting the sheet to a certain size, comprising the steps of: (a) filling an active material into the substrate sheet, ($b_2$) coating a portion to be cut and the periphery thereof in the substrate sheet with a resin, and (c) cutting the substrate sheet at the portion to be cut, wherein the step ($b_2$) is conducted prior to the step (c).

The present invention further relates to a method for manufacturing an electrode for a battery by filling an active material into a three-dimensional porous metal substrate sheet and cutting the sheet to a certain size, Comprising the steps of: (a) filling an active material into the substrate sheet, ($b_3$) impregnating a portion to be cut and the periphery thereof in the substrate sheet with a liquid containing a resin component, and (c) cutting the substrate sheet at the portion to be cut, wherein the step ($b_3$) is conducted prior to the step (c).

BRIEF DESCRIPTION OF THE SEVERAL VIEWS OF THE DRAWING

FIG. 4 is a cross sectional view of the main part of the electrode sheet made in still another embodiment of the present invention.

DETAILED DESCRIPTION OF THE INVENTION

Figure 1:
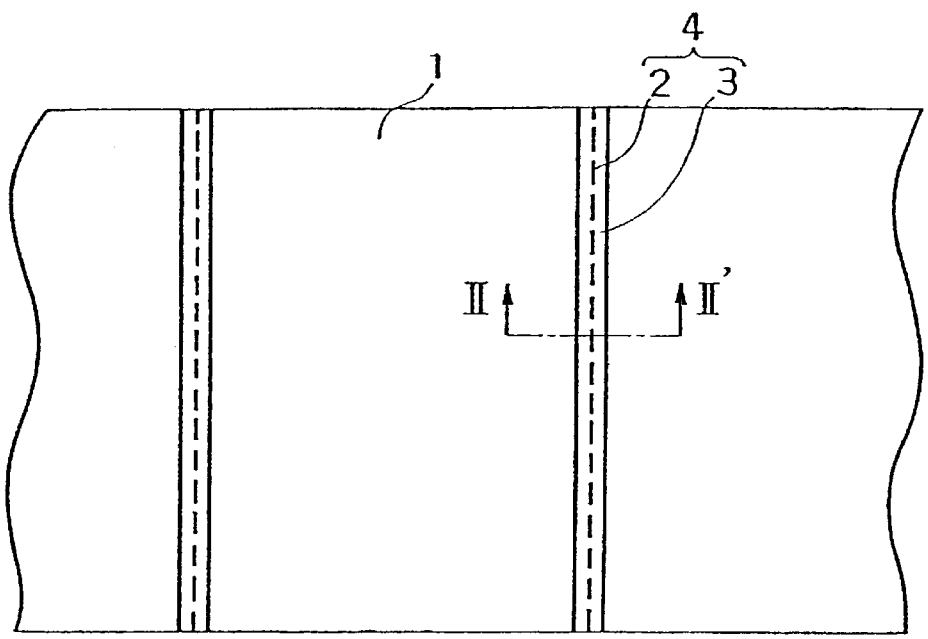
FIG. 1 is a plan view of a foamed nickel sheet used in an embodiment of the present invention in which a compressed and deformed portion is formed in a portion to be cut and the periphery thereof.

As the results of enthusiastic studies on a method for manufacturing an electrode for a battery by filling an active material into a three-dimensional porous metal substrate sheet and cutting the sheet to a certain size, the inventors of the present invention have found a method for eliminating inconveniences of the electrode resulting from the occurrence of burrs and cuttings and the coming off of the active material.

In the present invention, the above problems are solved by conducting an additional process to the manufacturing method comprising the process of filling an active material into a three-dimensional porous metal substrate sheet and the process of cutting the sheet at at portion to be cut.

In other words, the main feature of the present invention is to conduct a process selected from the group consisting of the process of pressing a portion to be cut and the periphery thereof in the substrate sheet, the process of coating the portion to be cut and the periphery thereof in the substrate sheet with a resin, and the process of impregnating the portion to be cut and the periphery thereof in the substrate sheet with a liquid containing a resin component, prior to the cutting of the substrate sheet.

Conducting at least one of these processes prior to the cutting of the substrate sheet makes it possible to obtain an electrode which is unlikely to suffer from burrs, inconveniences due to cuttings, and coming off of the active material. Therefore, as long as one of the above-mentioned three processes is conducted before the process of cutting the substrate sheet, the process of filling the active material can be conducted any time of before or after the process of cutting the substrate sheet, or before or after each of the above three processes.

Each embodiment of the present invention will be described as follows.

EMBODIMENT 1

The following is a description of the method for manufacturing an electrode for a battery (Embodiment 1) comprising the steps of: (a) filling an active material-into a three-dimensional porous metal substrate sheet, ($b_1$) pressing a portion to be cut and the periphery thereof in the substrate sheet, and (c) cutting the substrate sheet at the portion to be cut, wherein the step ($b_1$) is conducted prior to the step (c).

As mentioned above, the step (a) can be conducted at any time as long as the step ($b_1$) is conducted prior to the step (c).

In the step ($b_1$), the portion to be cut and the periphery thereof in the three-dimensional porous metal substrate sheet are pressed to be thinner. At this moment, in the pressed portions, acicular or fibriform metal, which is the frame of the substrate sheet, is either densely congested or virtually formed in one piece. Consequently, the occurrence of sharp-pointed burrs during the cutting process is prevented. An electrode obtained by cutting the sheet to a certain size has thinner end portions than the other portions, so that when a plurality of electrodes are laminated, the end portions of these electrodes are adjacent to each other with a large space therebetween. Even if burrs occur, this arrangement makes it hard for the burrs to be in contact with the counter electrode, thereby effectively preventing an internal short circuit in the battery.

In the aforementioned method, it is preferred that the step (a) is conducted after the step ($b_1$) because it achieves that the frame metal in the portion to be cut and the periphery thereof in the substrate sheet is densely congested and the pressed portions become thinner effectively.

EMBODIMENT 2

The following is a description of the method for manufacturing an electrode for a battery (Embodiment 2) comprising the steps of: (a) filling an active material into a three-dimensional porous metal substrate sheet, ($b_2$) coating a portion to be cut and the periphery thereof in the substrate sheet with a resin, and (c) cutting the substrate sheet at the portion to be cut, wherein the step ($b_2$) is conducted prior to the step (c).

As mentioned above, the step (a) can be conducted at any time as long as the step ($b_2$) is conducted prior to the step (c).

In the step ($b_2$) the portion to be cut and the periphery thereof in the substrate sheet is coated with the resin. This process can be easily done by applying a resin film onto the portion to be cut and the periphery thereof in the substrate sheet, and heating the film to be melted to adhere to the substrate sheet. Alternatively, a hot melt adhesive melted by heating may be applied to the portion to be cut and the periphery thereof in the substrate. Another alternative is that a liquid of comparatively high viscosity, which is preferably more than 10,000 mPa·s and not more than 100,000 mPa·s at 25° C., containing a resin component can be applied to the portion to be cut and the periphery thereof in the substrate sheet and dried.

The viscosity of the liquid can be measured using B-type rotary viscosity meter (JIS K7117(1987)).

The acicular or fibriform metal in the substrate sheet coated with the resin is bonded to each other with the resin, which prevents the occurrence of burrs during the cutting process. Even if burrs occur, an internal short circuit in the battery is effectively prevented because the end portions of the electrode are coated with an insulating resin.

EMBODIMENT 3

The following is a description of the method for manufacturing an electrode for a battery (Embodiment 3) comprising the steps of: (a) filling an active material into a three-dimensional porous metal substrate sheet, ($b_3$) impregnating a portion to be cut and the periphery thereof in the substrate sheet with a liquid containing a resin component, and (c) cutting the substrate sheet at the portion to be cut, wherein the step ($b_3$) is conducted prior to the step (c).

As mentioned above, the step (a) can be conducted at any time as long as the step ($b_3$) is conducted prior to the step (c).

In the step ($b_3$), the portion to be cut and the periphery thereof in the substrate sheet is impregnated with a liquid containing the resin component. The inner portion of the substrate can be impregnated with the resin component by applying or spraying a liquid of comparatively low viscosity, which is preferably 1 to 10,000 mPa·s at 25° C., containing the resin component in the dissolved or dispersed state, onto the portion to be cut and the periphery thereof in the substrate sheet. After this, the sheet is dried to remove a solvent and a dispersant.

According to this method, the resin component is filled into the pores in the portion to be cut and the periphery thereof in the substrate sheet. Consequently, the acicular or fibriform metal inside the substrate sheet is bonded to each other with the resin, which effectively prevents the occurrence of burrs and cuttings while the sheet is being cut. Even if burrs occur, an internal short circuit in the battery is effectively prevented because the end portions of-the electrode are coated with an insulating resin.

In the aforementioned method, it is preferred that the step ($b_3$) is conducted after the step (a) because it achieves that the resin tightly bonds the active material and the substrate frame, thereby enhancing the effect of preventing the active material from coming off.

EMBODIMENT 4

In the method (Embodiment 1) for manufacturing an electrode for a battery comprising the steps of: (a) filling an active material into a three-dimensional porous metal substrate sheet, ($b_1$) pressing a portion to be cut and the periphery thereof in the substrate sheet, and (c) cutting the substrate sheet at the portion to be cut, wherein the step ($b_1$) is conducted prior to the step (c), it is effective that the step ($b_2$) for coating the portion to be cut and the periphery thereof in the substrate sheet with a resin is conducted in addition to the step ($b_1$) prior to the step (c) (Embodiment 4).

In this method, the effects of Embodiments 1 and 2 are obtained synergistically. To be more specific, the acicular or fibriform metal in the portion to be cut and the periphery-thereof in the substrate sheet can be not only densely congested but also, especially in the surface portion of the substrate sheet, coated with a resin. This enhances the effect of preventing the occurrence of burrs and cuttings and the adhesion of the fallen active material onto the electrode surface. Even if burrs occur, an internal short circuit in the battery can be prevented further effectively because the end portions of the electrode are coated with an insulating resin and pressed to be thinner.

In the aforementioned method, the following three steps can be conducted in random order: (a) filling an active material into a substrate sheet, ($b_1$) pressing a portion to be cut and the periphery thereof in the substrate sheet, and ($b_2$) coating the portion to be cut and the periphery thereof in the substrate sheet with a resin. In either case, the synergistic effects can be obtained. Of these cases, it is preferred to conduct the step ($b_1$) first, followed by the step (a) and then the step ($b_2$).

EMBODIMENT 5

In the method (Embodiment 1) for manufacturing an electrode for a battery comprising the steps of: (a) filling an active material into a three-dimensional porous metal substrate sheet, ($b_1$) pressing a portion to be cut and the periphery thereof in the substrate sheet, and (c) cutting the substrate sheet at the portion to be cut, wherein the step ($b_1$) is conducted prior to the step (c), it is effective that the step ($b_3$) for impregnating the portion to be cut and the periphery thereof in the substrate sheet with a liquid containing a resin component is conducted in addition to the step ($b_1$)prior to the step (c) (Embodiment 5).

In this method, the effects of Embodiments 1 and 3 are obtained synergistically. To be more specific, the acicular or fibriform metal in the portion to be cut and the periphery thereof in the substrate sheet can be not only densely congested but also, especially in the inner portion of the substrate sheet, bonded to each other with a resin. This enhances the effect of preventing the occurrence of burrs and cuttings and the coming off of the active material while the sheet is being cut. Even if burrs occur, an internal short circuit in the battery can be prevented further effectively because the end portions of the electrode are coated with an insulating resin and pressed to be thinner.

In the aforementioned method, the following three steps can be conducted in random order: (a) filling an active material into a substrate sheet, ($b_1$) pressing a portion to be cut and the periphery thereof in the substrate sheet, and ($b_3$) impregnating the portion to be cut and the periphery thereof in the substrate sheet with a liquid containing a resin component. In either case, the synergistic effects can be obtained. Of these cases, it is preferred to conduct the step ($b_3$) first, followed by the step (a) and then the step ($b_1$). In this case, the resin component is filled into the pores in the portion to be cut and the periphery thereof in the substrate sheet, and the active material is filled into the remaining space. Then, the portion to be cut and the periphery thereof in the substrate sheet is pressed so as to firmly bond the metal frame, the resin, and the active material together.

The resin material used in the present invention is preferably provided with chemical stability against the electrolyte of a battery employing the electrode, a positive active material and a negative active material, and adhesion to the substrate frame. When the electrode is used in an alkaline storage battery with an alkaline electrolyte solution, it is preferable to use modified polyethylene, modified polypropylene, polyvinyl alcohol, ethylene-vinyl alcohol copolymer, styrene butadiene rubber, fluororesin like tetrafluoroethylene, or some similar material. These resins can be used for a film, a hot melt adhesive, or a liquid agent which is containing the resins either dissolved or dispersed in water or an organic solvent. The same resin materials can be used for the electrode for a lithium battery employing an organic electrolyte.

As the three-dimensional porous metal substrate sheet, a foamed metal sheet, a porous sheet of metallic fiber, and some similar material can be used. The three-dimensional porous metal substrate sheet has a space which exists three-dimensionally in disorder, that is, a space of communicating pores. The weight per unit area of the three-dimensional porous metal substrate sheet is preferably 200 to 8.00 g/m².

The above-mentioned metal can be nickel, aluminum, or copper.

The present invention can be applied to the manufacture of all kinds of battery electrodes, and suitable as methods for manufacturing a nickel positive electrode for an alkaline storage battery, a hydrogen storage alloy negative electrode for an alkaline storage battery a system of a lithium battery, and the like.

The present invention will be described more specifically, based on the following examples.

EXAMPLE 1

A hoop-like foamed nickel sheet having a width of 142 mm, a thickness of 1.0 mm, and a weight per unit area of 600 g/m² was used. As shown in FIG. 1, the foamed nickel sheet 1 was pressed in parts from both sides by a roller, so as to compress the portion 2 to be cut and the periphery 3 thereof. As a result, a compressed and deformed portion 4 was formed in the hoop at 103 mm intervals.

Figure 2:
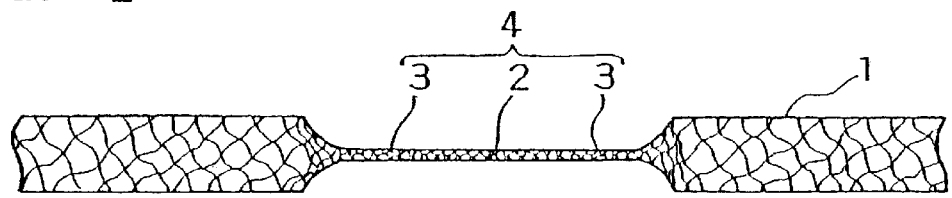
FIG. 2 is an enlarged cross sectional view of the line II–II' of FIG. 1.

FIG. 2 is an enlarged cross sectional view of the line II–II' of FIG. 1. The compressed and deformed portion 4 had a width of 5 mm and a thickness of 0.05 mm.

On the other hand, nickel hydroxide powder as an active material, metallic cobalt as an additive, and water were mixed to form a paste. The paste was filled into the pressed nickel sheet 1 by rubbing the paste thereinto, and then the sheet was dried at 90° C. After this, the entire sheet was rolled to be 0.6 mm in thickness, and the active material was firmly fixed inside the pores of the substrate sheet so as to provide an electrode sheet. Then, the sheet was cut by a cutter at the center of the compressed and deformed portion 4, that is, the portion 2 to be cut, so as to form a nickel positive electrode.

EXAMPLE 2

The same foamed nickel sheet 1 as in Example 1 was used. The same paste as in Example 1 was rubbed into the nickel sheet 1 and dried. The sheet was applied with a film of ethylene-vinyl alcohol copolymer having a width of 5 mm and a thickness of 0.2 mm on both sides thereof at 103 mm intervals, and was heated at 90° C. so that the film was melted to adhere to the sheet. Then, the entire sheet was rolled to be 0.6 mm in thickness to form an electrode sheet.

Figure 3:
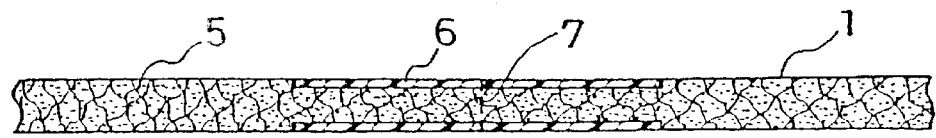
FIG. 3 is a cross sectional view of the main part of the electrode sheet made in another embodiment of the present invention.

FIG. 3 is a cross sectional view of the main part of the electrode sheet. In the drawing, 5 and 6 indicate an active material and a resin film, respectively. The sheet was cut at the center of the adhered film, that is, the portion to be cut, so as to provide a nickel positive electrode.

EXAMPLE 3

The same foamed nickel sheet 1 as in Example 1 was used. The same paste As in Example 1 was rubbed into the nickel sheet 1 and dried. The sheet was applied with a resin solution on both sides thereof in a belt having a width of 5 mm at 103 mm intervals. As a result, the pores in the belt-shaped portions in the sheet were impregnated with the resin. After this, the sheet was dried at 90° C.

The resin solution applied on the sheet was a mixture composed of a 10 wt % of ethylene-vinyl alcohol copolymer, 58 wt % of n-propanol, and 32 wt % of water. The viscosity of the mixture was about 100 mPa·s.

The entire sheet was rolled to be 0.6 mm in thickness so as to form an electrode sheet. The sheet was cut at the center of the belt-shaped portion applied with the resin solution, that is, the portion to be cut, so as to provide a nickel positive electrode.

EXAMPLE 4

The same foamed nickel sheet 1 as in Example 1 was used. After the same compressed and deformed portion 4 as in Example 1 was formed in the nickel sheet 1, the same paste as in Example 1 was rubbed into the nickel sheet 1 and dried. Then, the resin film 6 used in Example 2 was applied onto the compressed and deformed portion 4, and heated at 90° C. to make the film melt and adhere to the sheet. The entire sheet was rolled to be 0.6 mm in thickness to provide an electrode sheet.

FIG. 4 is a cross sectional view of the main part of the electrode sheet. The sheet was cut at the center of the adhered film 6, that is, the portion to be cut, so as to provide a nickel positive electrode.

EXAMPLE 5

The same foamed nickel sheet 1 as in Example 1 was used. The nickel sheet 1 was applied with the same resin solution as in Example 3 on both sides thereof in a belt having a 5 mm width at 103 mm intervals. As a result, the pores in the belt-shaped portions in the sheet were impregnated with the resin. The sheet was dried at 90° C., and the same paste as in Example 1 was rubbed into the sheet and dried. Then, the belt-shaped portions applied with the resin solution were pressed from both sides to form a compressed and deformed portion of 0.3 mm in thickness. The entire sheet was rolled to be 0.6 mm in thickness to provide an electrode sheet. The sheet was cut at the center of the compressed and deformed portion, that is, the portion to be cut, so as to provide a nickel positive electrode.

COMPARATIVE EXAMPLE 1

The same foamed nickel sheet 1 as in Example 1 was used. The same paste as in Example 1 was filled into the nickel sheet 1 and dried. After this, the entire sheet was rolled to be 0.6 mm in thickness to form an electrode sheet. The sheet was cut to the same size as the positive electrode in Example 1. The cross section was deburred by grinding it with diamond so as to form a nickel positive electrode.

COMPARATIVE EXAMPLE 2

The same foamed nickel sheet 1 as in Example 1 was used. The same paste as in Example 1 was filled into the sheet and dried. After this, the entire sheet was rolled to be 0.6 mm in thickness to form an electrode sheet. The sheet was cut to the same size as the positive electrode in Example 1. Then, the end portion of a width of 2 mm including the cross section was pressed until it became 0.1 mm in thickness so as to form a nickel positive electrode.

Figure 5:
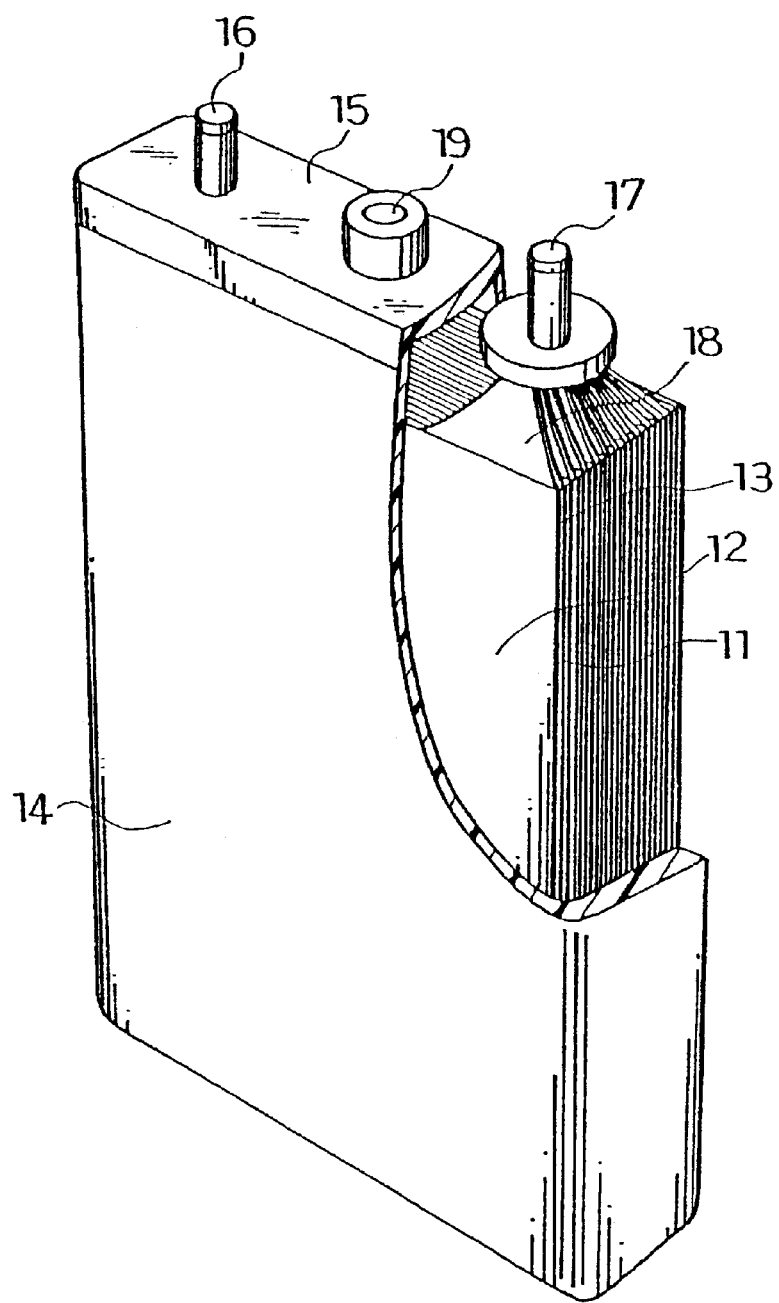
FIG. 5 is a perspective cutaway view of a battery before being filled with an electrolyte solution, which has been made to evaluate the effects of the present invention.

By using the nickel positive electrodes manufactured in Examples 1 through 5 and Comparative Examples 1 and 2 as described above, an electrode plate group for a nickel-metal hydride storage battery was composed as shown in FIG. 5. The incidence of an internal short circuit was examined.

The electrode plate group comprises, in alternate arrangement, of a nickel positive electrode 11, a separator 12 made of polypropylene non-woven fabric, and a hydrogen storage alloy negative electrode 13 manufactured by a normal process using a punched metal as a substrate. The electrode plate group includes ten positive electrodes and 11 negative electrodes and is stored in a battery case 14 made of polypropylene. Each of the positive electrodes 11 and each of the negative electrodes 13 are connected to a positive electrode terminal 16 and a negative electrode terminal 17 provided on a terminal plate 15 via their respective leads 18. The terminal plate 15 has an injection hole 19. In general, the injection hole 19 is sealed after injecting a liquid through it, so as to complete the assembly of the battery.

The incidence of internal short circuit before injecting a liquid was evaluated in the following manner.

A voltage of 300 V was applied between the positive electrode terminal 16 and the negative electrode terminal 17 to measure the insulation resistance. When the measured value was 1 MΩ or below, it was assumed to be short-circuited between the positive electrode and the negative electrode. The incidence of internal short circuit was calculated using 1000 samples for each case.

The results show that the incidence of internal short circuit was drastically reduced in the cases where the positive electrodes of Examples 1 through 5 were used, as, compared with the cases where the positive electrodes of Comparative Examples 1 and 2 were used.

Of all the Examples, most excellent were Example 4 in which the substrate sheet had a compressed and deformed portion and the portion was coated with a resin, and Example 5 in which the substrate sheet was impregnated with a resin solution and dried, and the portion was compressed and deformed; none of the samples of these examples short-circuited. The incidence of internal short circuit was 0.2%, 0.3%, and 0.3%, respectively, in Example 1 where the substrate sheet had compressed and deformed portion, Example 2 where the substrate sheet was coated with a resin in part, and Example 3 where the substrate was impregnated with a resin solution portions. On the other hand, in Comparative Examples 1 and 2, the incidence was 1.2% and 1.5%, respectively.

As described hereinbefore, it has been shown that the effect of preventing an internal short circuit in a battery is achieved by conducting one of the three steps: pressing the portion to be cut and the periphery thereof in the substrate sheet; coating the portion to be cut and the periphery thereof in the substrate sheet with a resin; and impregnating the portion to be cut and the periphery thereof in the substrate sheet with a liquid containing a resin component. It has been also shown that an internal short circuit in a battery is prevented more effectively by conducting, in addition to the step of pressing the portion to be cut and the periphery thereof in the substrate sheet, either one of the two steps: coating the portion to be cut and the periphery thereof in the substrate sheet with a resin, and impregnating the portion to be cut and the periphery thereof in the substrate sheet with a liquid containing a resin component.

Hence, the use of a battery electrode obtained in the method of the present invention effectively prevents the internal short circuit in a battery.

What is claimed is:

1. A method for manufacturing an electrode for a battery by filling an active material into a three-dimensional porous metal substrate sheet having a top and bottom surface and cutting said sheet to a certain size, comprising the steps of:

(a) filling an active material into said substrate sheet, ($b_1$) pressing both the top and bottom surface together so as to form a reduced thickness section having a lower surface positioned above the bottom surface and a higher surface positioned below the top surface, and (c) cutting along a portion of said reduced thickness section, wherein said step ($b_1$) is conducted prior to said step (c), wherein said portion extends from a first edge of said substrate sheet to a second edge of said substrate sheet and the cutting step comprises:

cutting said portion from the first edge to the second edge.

2. A method for manufacturing an electrode for a battery in accordance with claim 1, wherein the reduced thickness section contains the active material.

3. A method for manufacturing an electrode for a battery by filling an active material into a three-dimensional porous metal substrate sheet and cutting said sheet to a certain size, comprising the steps of:

(a) filling an active material into said substrate sheet, ($b_1$) pressing a portion of said substrate sheet to be cut and a periphery thereof, and (c) cutting said substrate sheet at said portion, wherein said step ($b_1$) is conducted prior to said step (c), said method further comprising, prior to said step (c), either step of:

($b_2$) coating said portion and said periphery thereof with a resin, or ($b_3$) impregnating said portion and said periphery thereof with a liquid containing a resin component.

4. A method for manufacturing an electrode for a battery by filling an active material into a three-dimensional porous metal substrate sheet and cutting said sheet to a certain size, comprising the steps of:

(a) filling an active material into said substrate sheet, ($b_2$) coating a portion of said substrate sheet with a resin, and (c) cutting a section of said portion of the substrate sheet, wherein said step ($b_2$) is conducted prior to said step (c).

5. A method for manufacturing an electrode for a battery by filling an active material into a three-dimensional porous metal substrate sheet and cutting said sheet to a certain size, comprising the steps of:

(a) filling an active material into said substrate sheet, ($b_3$) impregnating a portion of said substrate sheet with a liquid containing a resin component, and (c) cutting a section of said portion of the substrate sheet, wherein said step ($b_3$) is conducted prior to said step (c).

* * * * *